(12) United States Patent
Richardson et al.

(10) Patent No.: US 9,227,156 B2
(45) Date of Patent: Jan. 5, 2016

(54) METHOD AND APPARATUS FOR REACTIVE GAS REMEDIATION

(71) Applicant: ChemTreat, Inc., Glen Allen, VA (US)

(72) Inventors: John Richardson, Hanover, VA (US); Kevin Gottschalk, Maidens, VA (US); Douglas McIlwaine, Ashland, VA (US)

(73) Assignee: CHEMTREAT, INC., Glen Allen, VA (US)

( * ) Notice: Subject to any disclaimer, the term of this patent is extended or adjusted under 35 U.S.C. 154(b) by 190 days.

(21) Appl. No.: 14/078,520

(22) Filed: Nov. 12, 2013

(65) Prior Publication Data

US 2014/0147360 A1 May 29, 2014

Related U.S. Application Data

(60) Provisional application No. 61/724,437, filed on Nov. 9, 2012.

(51) Int. Cl.
*A61L 9/00* (2006.01)
*A61L 9/04* (2006.01)
*A61L 9/014* (2006.01)
*A61L 9/12* (2006.01)
*B01D 53/40* (2006.01)
*B01D 53/81* (2006.01)
*B01D 53/83* (2006.01)
*B01D 53/54* (2006.01)
*B01D 53/44* (2006.01)
*B01D 53/82* (2006.01)

(52) U.S. Cl.
CPC ............... *B01D 53/54* (2013.01); *B01D 53/40* (2013.01); *B01D 53/44* (2013.01); *B01D 53/82* (2013.01); *B01D 2251/304* (2013.01); *B01D 2257/408* (2013.01)

(58) Field of Classification Search
CPC ......... B01D 53/40; B01D 53/81; B01D 53/83
USPC .................................................. 422/122, 123
See application file for complete search history.

(56) References Cited

U.S. PATENT DOCUMENTS

| 4,116,881 | A | * | 9/1978 | Shibata et al. ................. 502/401 |
| 5,126,070 | A | * | 6/1992 | Leifheit et al. ............ 252/186.36 |
| 5,730,948 | A | * | 3/1998 | Klatte et al. .................... 423/477 |
| 5,776,850 | A | * | 7/1998 | Klatte .................. A23K 1/1603 502/60 |
| 6,663,902 | B1 | * | 12/2003 | Hei et al. ........................ 424/661 |
| 8,741,223 | B2 | * | 6/2014 | Mason et al. .................. 422/123 |
| 2007/0274887 | A1 | * | 11/2007 | Scialla et al. .................. 423/210 |

FOREIGN PATENT DOCUMENTS

JP          5-228333 A   *   9/1993   ............. B01D 53/34

* cited by examiner

*Primary Examiner* — Timothy Vanoy
(74) *Attorney, Agent, or Firm* — Oliff PLC

(57) ABSTRACT

Disclosed are methods, materials, apparatus and systems for removing or suppressing ambient levels of reactive gas contaminants, particularly acidic gases, using particles of zeolite, sepiolite or other suitable carrier material impregnated with at least one treatment compound selected to react with the acidic gas(es). The methods involve contacting a contaminated gas stream with the impregnated carrier materials whereby at least a portion of the reactive gases contacts the treatment compound and reacts, thereby consuming the reactive gas molecules.

22 Claims, 5 Drawing Sheets

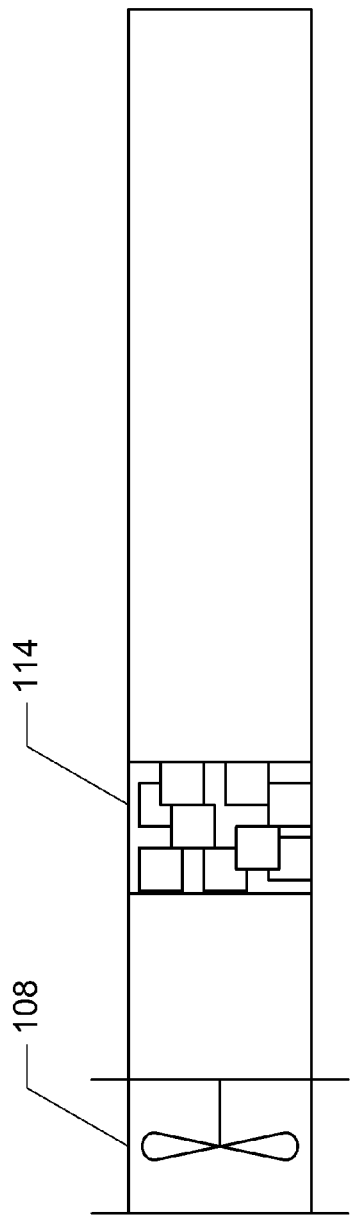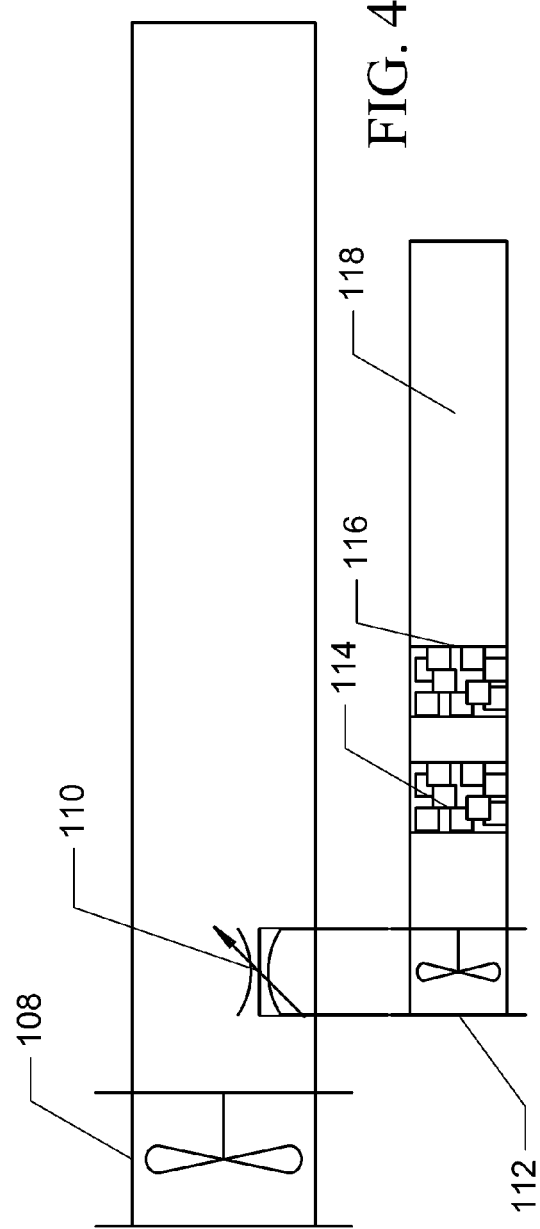

METHOD AND APPARATUS FOR REACTIVE GAS REMEDIATION

PRIORITY STATEMENT

This application claims priority from U.S. Prov. Pat. Appl. No. 61/724,437, filed Nov. 9, 2012, the contents of which are incorporated by reference in their entirety.

FIELD OF THE INVENTION

This disclosure relates to methods and apparatus for using a combination of dry materials configured for reacting a treatment compound and an acidic gas contaminant from an air stream. This combination of carrier material(s) and treatment compound(s) can then be used for treating ambient air and reducing the level of contaminants including, in particular, reactive gases such as hydrogen cyanide, hydrogen sulfide, hydrochloric acid, hydrogen fluoride, hydrogen iodide, hydrogen bromide, nitric acid vapor, chlorine, carbon disulfide and mercaptans. Depending on the treatment compound(s) selected, the disclosed methods can also provide for the gradual evolution of chlorine dioxide initiated by the acidic contaminant(s), thereby providing low, typically at parts-per-million (ppm) or parts-per-billion (ppb) levels, of chlorine dioxide for additional treatment of the contaminated air stream. Other embodiments of the disclosed methods may incorporate one or more absorbent materials for removing other contaminants from the gas stream. It is believed that these inventions will have particular utility in connection with mining, chemical and agricultural operations that tend to release reactive gases at levels that may be detrimental to workers, livestock and/or equipment.

BACKGROUND OF THE INVENTION

The generation and release of reactive gases can produce immediate and troublesome problems for the environment, workers, livestock and/or equipment located at the plant, found in the general vicinity of the plant and/or located miles downwind of the plant. When these corrosive gases attack buildings, vehicles, or plants, the results can be devastating. Similarly, when these gases are inhaled or come into contact with human or animal skin, the harmful results are can be quickly noticed and extreme.

A number of treatment methods for reducing or otherwise addressing gas emissions from industrial processes and facilities have been developed through the years including, for example, wet scrubbing in which the targeted compound(s) or particulate(s) are brought into contact with one or more scrubbing solution(s). The scrubbing solution(s) may comprise simply water (for dust) or may comprise or incorporate other reagents or solvents in order to enhance the removal and/or neutralization of the targeted compound(s). Wet scrubbing is particularly effective in removing water soluble toxic and/or corrosive gases like hydrochloric acid (HCl) or ammonia ($NH_3$). The wet scrubber efficiency can typically be improved by increasing residence time in the scrubber and/or by increasing the contact area between the scrubber solution and the treated gas stream.

In a dry or semi-dry scrubbing system, however, the gas stream is not saturated with water. In some cases no moisture is added, while in other cases a minor amount of moisture can be introduced. Accordingly, dry scrubber operations do not generally exhibit the stack steam plume or wastewater handling/disposal requirements associated with wet scrubbing operations. Dry scrubbing systems have been used, for example, for removing acidic gases (such as $SO_2$ and HCl), particularly in connection with treating flue gases. Most dry type scrubbing systems will include both 1) a mechanism for introducing the gas sorbent material into the gas stream and 2) a particulate matter control device for removing reaction products and excess sorbent material as well as any particulate matter already present in the gas stream. Depending on the sorbent media and configuration, dry scrubbing systems can be arranged for handling specific gases including, for example, hydrogen sulfide, mercaptans, aldehydes, thiols, other volatile organic compounds including, for example, dimethyl sulfide and dimethyl disulfide.

Dry scrubbing systems can be arranged for injecting alkaline material(s) (such as hydrated lime and/or soda ash) useful for treating gas streams contaminated with acidic gases such as $CO_2$, $SO_2$ and HCl. The acidic compounds react with the alkaline sorbents to form solid salts, which are then removed in the downstream particulate control device. Higher removal efficiencies (80% or better) can be achieved by increasing the gas stream humidity (i.e., cooling the gas stream with a water spray) without saturating the gas stream. These devices have been widely used on, for example, industrial boilers and municipal waste incinerators.

A third method, and another type of "dry" scrubbing, involves removing a target compound from a gas stream by passing the gas stream through a cartridge or other container that is filled with at least one material selected for its ability to absorb the target compound. Activated carbon, for example, is widely used in compressed air and gas purification to remove oil vapors, odors, and other hydrocarbons from the air. The absorber material has to be replaced or otherwise regenerated after its surface is saturated with the target compound(s).

Wet scrubbers are most commonly used for removing acidic gases from process and/or facility emissions and have been in use for many decades. As detailed above, the wet scrubber uses a liquid—typically water or an aqueous solution—to absorb the acidic gas from the carrier gas stream. When properly configured, the scrubbed gas stream contains residual levels of the acidic gas that do not exceed applicable air quality and worker exposure limits. The scrubbing liquid typically contains a reactive agent that "neutralizes" the absorbed acidic species, thereby producing a scrubber effluent stream that is relatively easily disposed or treated in conventional wastewater treatment plants.

In some instances, however, it is inconvenient or impractical to install a wet scrubber system. In confined, spaces a wet scrubber system may not be practical, and the caustic scrubber solutions can pose material handling hazards. In other instances, the capital expense of a caustic scrubber may also be considerable.

The generation of chlorine dioxide has been the subject of a number of U.S. patents including, for example, U.S. Pat. Nos. 6,635,230; 6,605,558; 6,503,419; 6,458,735; 6,423,289; 6,379,643; 6,174,508; and 5,885,543 to Klatte. These patents disclose various methods for producing chlorine dioxide by activating zeolite crystals that are impregnated with a metal chlorite with protons from a second compound such as acetic acid, phosphoric acid, and citric acid, and/or metal salts such as ferric chloride, ferric sulfate, $ZnSO_4$, $ZnCl_2$, $CoSO_4$, $CoCl_2$, $MnSO_4$, $MnCl_2$, $CuSO_4$, $CuCl_2$, and $MgSO_4$. According to Klatte, the zeolite can be activated by flowing a fluid through a combination of zeolite crystals impregnated with an optional water-retaining substance (to suppress moisture induced outgassing) and sodium chlorite and a second group of zeolite crystals impregnated with a proton generating species.

U.S. Pat. No. 5,776,850 to Klatte, for example, discloses methods for impregnating zeolite crystals with a compound comprising sodium chlorite, acetic acid, citric acid, chlorine, sodium sulfite or sodium bisulfite and the zeolite crystals impregnated according to the disclosed methods.

U.S. Pat. No. 5,853,689 to Klatte, for example, disclose methods for producing chlorine dioxide by activating a mixture of impregnated zeolite crystals, the mixture itself, and a method for regenerating the zeolite crystal mixture after chlorine dioxide production. The activation is accomplished by contacting the zeolite crystal mixture with water, a moisture-containing gas, liquid hydrogen peroxide, liquid sulfuric acid, a ferric chloride solution or a sodium chlorate solution. A zeolite crystal mixture can include zeolite crystals impregnated with sodium chlorite, ferric chloride and/or ferric sulfate or, optionally, calcium chloride. An alternative zeolite crystal mixture can include zeolite crystals impregnated with sodium chlorate, sulfuric acid, a deliquescent and an oxidizer including, for example, hydrogen peroxide, sodium metabisulfite or sodium bisulfite. Klatte teaches that the chlorine dioxide release rate can be controlled by, for example, selecting the concentration and amount of activating liquid, or impregnating the zeolite(s) with a selected weight ratio of one or more of the impregnating compounds.

U.S. Pat. No. 5,730,948 to Matte, for example, discloses methods for producing chlorine dioxide by moving fluid (such as air) through a first bed of zeolite crystals impregnated with an acid and then moving the acid-carrying fluid through a second bed of zeolite crystals impregnated with sodium chlorite and/or chlorine to produce chlorine dioxide. In an optional configuration, some of the chlorine dioxide can be absorbed as it passes through a third bed of chemically impregnated zeolite crystals.

Each of the U.S. patents referenced above is hereby incorporated, in its entirety, by reference, and particularly with reference to the formulation and production of zeolite materials impregnated, doped or loaded with a reactive compound including, for example, alkali metal chlorites.

BRIEF SUMMARY OF THE INVENTION

Disclosed are methods, materials and apparatus for removing or suppressing ambient levels of reactive gas contaminants, particularly acidic gases, using particles of zeolite, sepiolite or other suitable carrier material impregnated with at least one treatment compound selected to react with the acidic gas(es). The methods involve contacting a contaminated gas stream with the impregnated carrier materials whereby at least a portion of the reactive gases contacts the treatment compound and reacts, thereby consuming the reactive gas molecules. When sized and configured appropriately, a system utilizing the disclosed methods can remove a quantity of the reactive gases the air stream sufficient to meet regulatory and occupational safety requirements.

The carrier material and its impregnating treatment compound(s) may be formed or otherwise manufactured to provide a specific particle size range and/or configuration so as to cooperate with the apparatus into which the contaminated air will be introduced or, in other embodiments, through which the contaminated air will flow. The carrier particles can be sized and their configuration can be selected in order to balance competing considerations including, for example, increasing surface area/reactivity while suppressing generation of fines.

BRIEF DESCRIPTION OF THE DRAWINGS

Example embodiments of apparatus that could be used for practicing the invention are described more fully below with reference to the attached drawings in which:

FIG. 3 illustrates a third example embodiment of an apparatus that can be used to practice the method of controlling reactive gases using forced convection with inline positioning of the impregnated carrier particles;

FIG. 4 illustrates a fourth example embodiment of an apparatus that can be used to practice the method of controlling reactive gases using forced convection with bypass positioning of the impregnated carrier particles;

Figure 1:
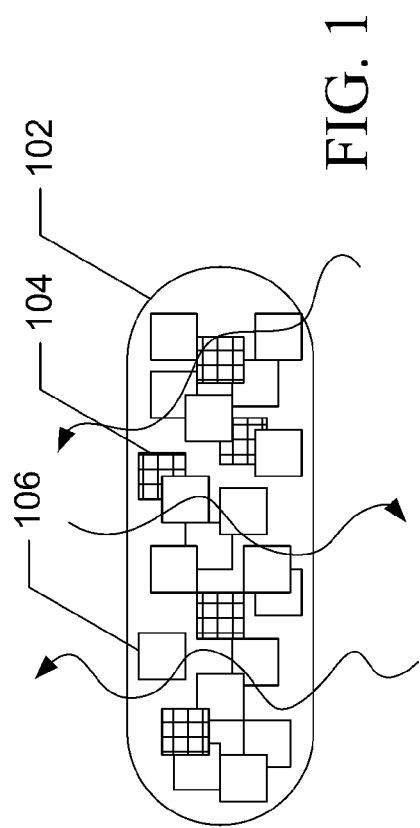
FIG. 1 illustrates a first example embodiment of an apparatus that can be used to practice the method of controlling reactive gases using natural convection.

It should be noted that these figures are intended to illustrate the general characteristics of methods and apparatus with reference to certain example embodiments of the invention and thereby supplement the detailed written description provided below. These drawings are not, however, to scale and may not precisely reflect the characteristics of any given embodiment, and should not be interpreted as defining or limiting the range of values or properties of embodiments within the scope of this invention. In particular, the relative sizing and positioning of particular elements and structures may be reduced or exaggerated for clarity. Similarly, structures that would well known to those of ordinary skill in the art including, for example, blowers, filters and control lines have been omitted for clarity but would, obviously, be helpful or necessary for implementing such an apparatus and method.

DETAILED DESCRIPTION

Detailed below are examples of the materials, apparatus and methods for removing or suppressing reactive gas contaminants, particularly acidic gases, from a contaminated gas stream. The materials utilized include particles of zeolite, sepiolite or other suitable carrier material impregnated with one or more treatment compounds that are selected for the ability to react with the reactive gas contaminant, thereby consuming the gas contaminant and removing it from the air stream. The treatment compound may be loaded on the carrier particles as a dry compound or as a solution and then dried in order to achieve the desired loading and infiltration into the carrier particles. The loading rates will vary depending factors such as the density and porosity of the carrier particles, but it is expected that 5-35 wt % loadings of the treatment compound(s) could be achieved in the impregnated carrier particles and would be suitable for a wide range of applications.

The alkali metal chlorites are one class of treatment compound that is useful for reacting with and thereby removing acidic gases from a contaminated gas stream. The reaction of the alkali metal chlorites with the acid gas(es) in a contaminated gas stream also tends to release chlorine dioxide, an oxidizing agent that can provide a second level of decontamination for the contaminated gas stream. In an example embodiment of the invention, the carrier particles throughout the system are formulated to be free or at least substantially free of acidic compounds or other compounds that would tend to react with the alkali metal chlorites. Similarly, in an example embodiment of the invention, the system can be configured to avoid injecting or otherwise introducing acidic compounds or other compounds that would tend to react with the alkali metal chlorites. The introduction or presence of such compounds within the carrier particle beds would cause the evolution of chlorine dioxide from the carrier particles to be independent of the levels of acidic gas(es) present in the incoming air stream and would tend to consume the treatment compound prematurely.

The impregnated carrier particles can be sized for various applications with smaller particles and, consequently, higher surface area/mass and higher surface area/volume, being preferred for incorporation into fixed filter elements or surface coatings and larger particles being preferred for packed bed and fluidized bed applications. The impregnated carrier particles intended for use in fluidized bed applications can also include surface modification(s) in order to harden or protect the surface and thereby reduce the fines generated by particle-to-particle contact. The larger particles may, for example, be coated with polymeric fibers that form a protective mesh on the particle surface, while still allowing the treated gas stream to contact a substantial portion of the particles' surface area. Similarly, microporous films or layers having pore size and density sufficient to allow sufficient contact between the treated gas stream and the surface area of the impregnated carrier particles could be applied to the particle surface.

Example

HCN Gas Removal

Step 1—Apply the gas stream containing hydrogen cyanide (HCN) to the treatment compound provided on the impregnated carrier particle to react with and consume the hydrogen cyanide. When an alkali metal chlorite is selected as the treatment compound, the acidic gas (HCN) will react with the chlorite to form a less toxic cyanate and release a corresponding volume of chlorine dioxide. When sodium chlorite is used as the treatment compound, for example, the reaction proceeds according to Formula [1]:

$$2HCN_{gas} + 5NaClO_{2solid} \rightarrow 2NaCN + 4ClO_{2gas} + 2H_2O \qquad [1]$$

Step 2—When the treatment compound(s) include a chlorite, chlorine dioxide will be released at relatively low levels generally corresponding to levels of the acidic gas contaminant(s) that are driving the reaction illustrated above in Formula [1]. These low levels of chlorine dioxide are then free to react with other species present in the treated gas stream in order to degrade organic compounds, provide biocidal activity and/or provide a secondary breakdown other compounds to form less toxic products. This second decontamination step can improve the overall performance of the method and allow remediation of a wider range of compounds and microorganisms that may also be present in the contaminated gas stream.

This same basic mechanism is expected to come into place for any combination of contaminants that include at least one acidic gas having an acidic activity sufficient to react with and release chlorine dioxide when they contact treatment compounds that include a chlorite or other chlorine dioxide producing compound. Accordingly, the disclosed methods and compositions are expected to be particularly effective for treating gas streams that include a combination of acidic and organic gas species to reduce both the reactive and organic species within a treated gas stream. The resulting treated gas streams will, therefore, exhibit reduced corrosiveness and toxicity.

By utilizing methods and materials that rely only on solid phase and gas phase reactions, the systems incorporating the present methods and materials may be deployed without the difficulties associated with liquid scrubber methods. The systems incorporating the present methods and materials can also be deployed as a built-in treatment system or as a portable apparatus that can be moved readily and deployed where needed within a plant/factory/mine to address episodic contaminant issues and/or improve the working conditions as necessary to protect the workers.

In simple terms, the methods, materials and apparatus disclosed herein can be tailored to treat a variety of reactive gases in which the targeted gas is consumed during the production of chlorine dioxide which, in turn, provides an additional chemical species for reducing the concentration of contaminants within the treated gas stream.

$$\text{Reactive Species}_{gas} + \text{Chlorite}_{solid} \rightarrow \text{Consumption of reactive species} + \text{Chlorine dioxide}$$

In addition to the impregnated carrier particles and the treatment compound(s) provided thereon, the treatment apparatus can incorporate additional particles, particularly absorbent particles, configured for addressing other contaminants found in the ambient gas stream and may include other treatment compounds, such as desiccants for controlling moisture, within the treatment apparatus and/or in the treated air expelled from the apparatus.

Trial System Evaluation

A 500 scfm blower was fitted with a fluidized bed container to which was added about 100 lbs of sodium chlorite-impregnated zeolite particles to form a stand-alone air treatment module having a static particle layer depth of about 1 foot. The chlorite impregnation level of the particles was about 20 wt %. A filter was provided downstream for removing fines from the treated air stream. A variety of chlorite-impregnated zeolite particle sizes were evaluated and, for this particular arrangement, it was determined that particles on the order of about 0.25 inches in diameter provided the best results. Larger particles did not appear to provide enough surface area to achieve sufficient reaction during the residence time provided by the system. Smaller particles exhibited higher reactivity, but tended to degrade more quickly and generate fines that clogged the output filter and reduced air flow through the system.

Figure 5:
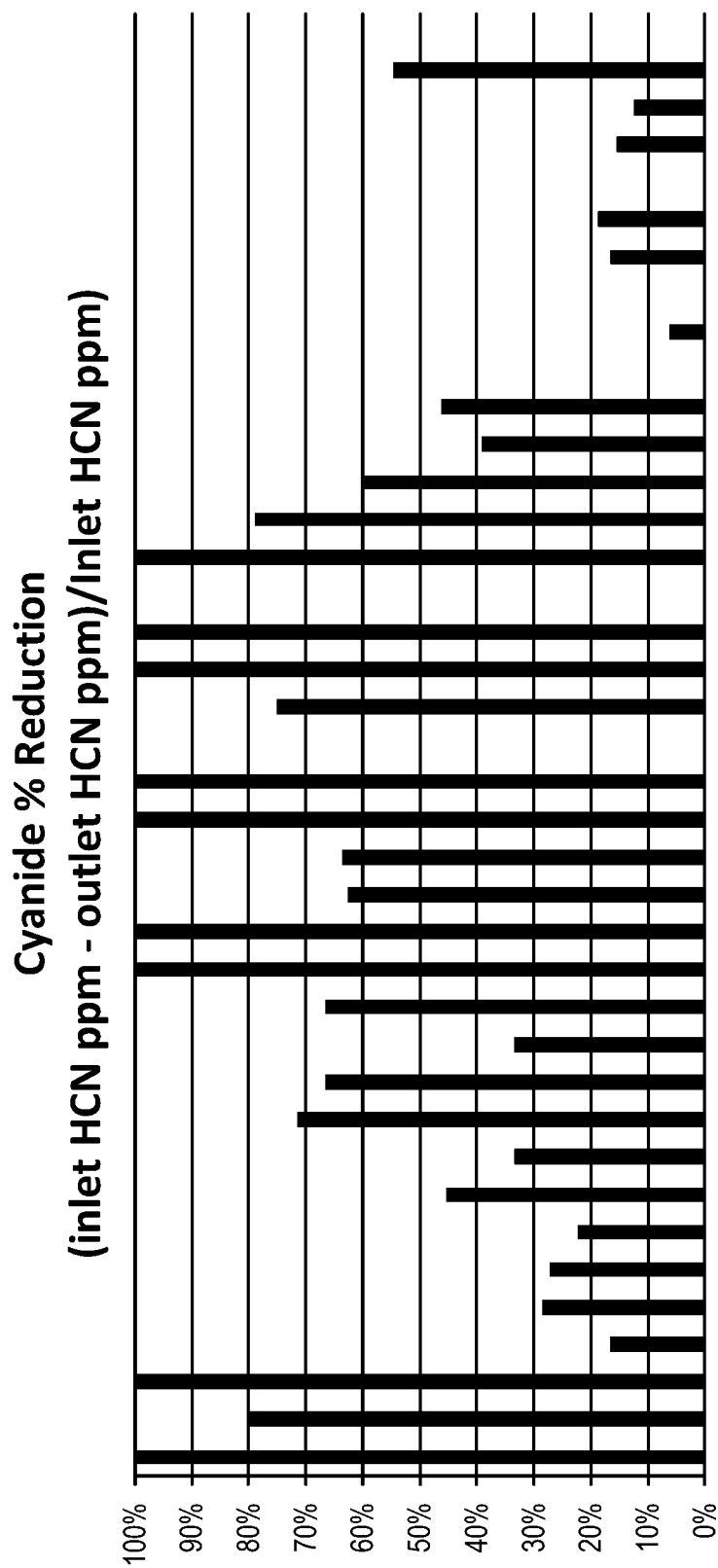
FIG. 5 is a chart illustrating the reduction of ambient HCl achieved by an embodiment of the disclosed apparatus configured so that the impregnated carrier particles are maintained in a fluidized bed.
Figure 6:
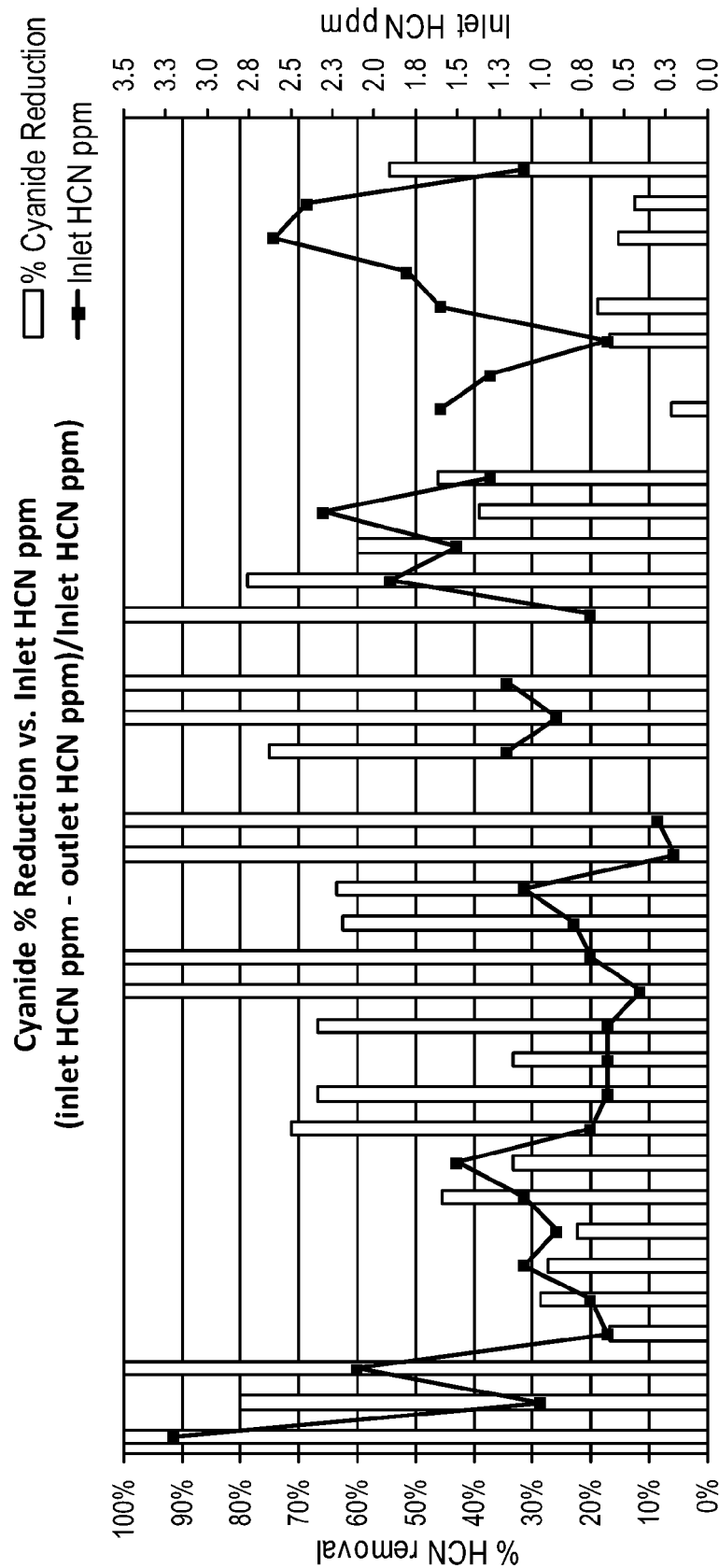
FIG. 6 is a chart illustrating the reduction of ambient HCN achieved by an embodiment of the disclosed apparatus configured so that the impregnated carrier particles are maintained in a fluidized bed in combination with the corresponding HCN levels.
Figure 7:
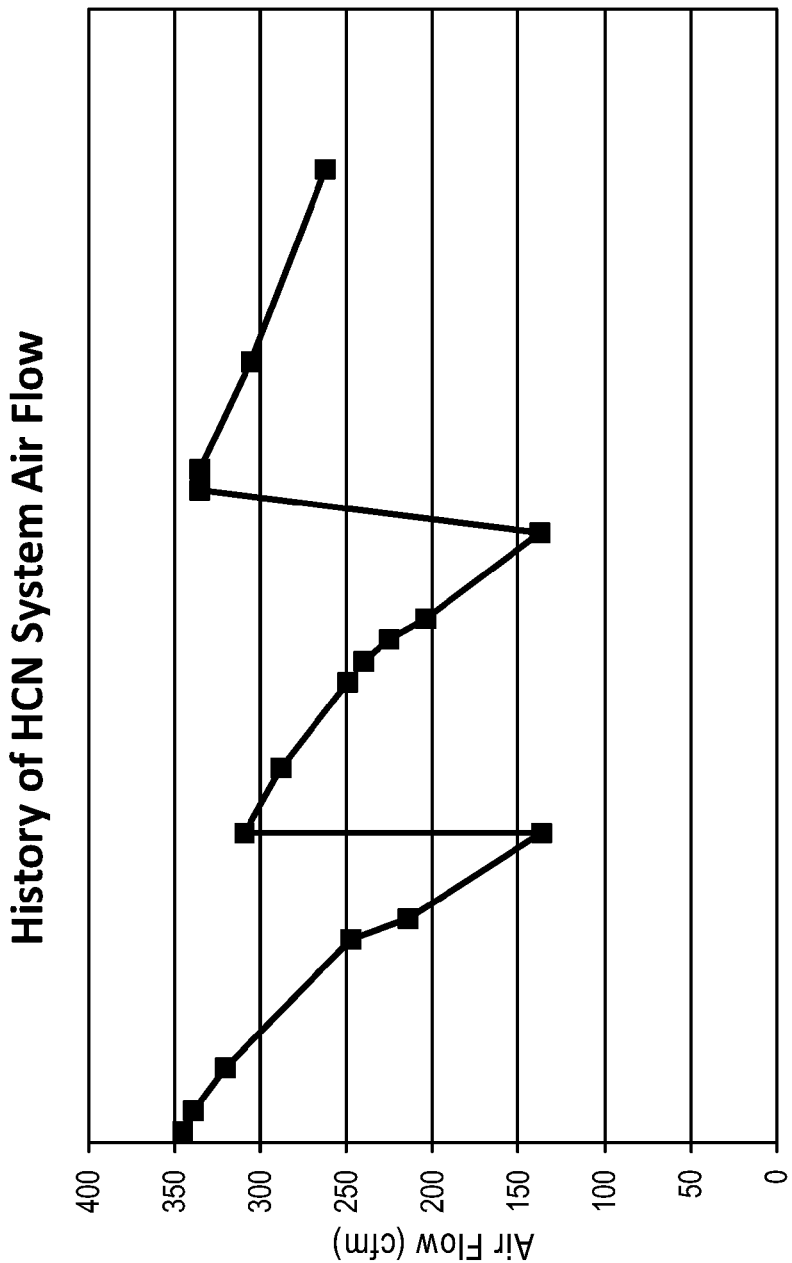
FIG. 7 is a chart illustrating the throughput drop off associated with the collection of fines on a downstream filter member.

Ambient air containing low levels of HCN (typically less than 3 ppm) was then forced through the fluidized bed, and the intake and outgoing HCN levels were monitored periodically. As reflected in FIG. 5, the percent of the intake HCN removed in the fluidized bed averaged about 55% with the results on some days approaching 100%.

Depending on the average concentration of the targeted compound, the volume of the impregnated carriers, the loading of the chlorine dioxide source compound and the flow rate of the treated gas stream, one of ordinary skill in the art could calculate a replacement schedule so that the system is not depleted before the impregnated carrier is replaced or recharged. Alternatively, a control system may be used whereby the removal percentage is monitored with the impregnated carrier being replaced or recharged when the average (or absolute) performance drops below a target removal level.

While the trial was conducted with a 500 scfm system, air treatment systems according to the methods and materials disclosed herein can be sized as necessary to achieve a desired result. Systems could, for example, easily be configured for treating air flows in the 1,000 to 5,000 scfm range and adjust the zeolite size to the appropriate size based on both the air flow and bed depth.

Further, air treatment systems according to the methods and materials disclosed herein can be configured for control by a plant's cyanide (or other targeted gas) warning system whereby the air treatment systems would be engaged only when higher levels of the targeted gas were detected in order to provide an additional engineering safeguard for operations that do, or may, release cyanide or another targeted gas periodically.

The apparatus according to the invention includes a combination of a carrier particle, such as a zeolite, and a dry chlorine dioxide generating compound or compounds, such as sodium chlorite or a combination of sodium chlorite and sodium hypochlorite, provided in a gas permeable bag, as a surface treatment, packed bed, fluidized bed or other container that can be exposed to a flow of ambient air through natural or forced convection. The carrier particles and the chlorine dioxide generating compound(s) are provided in amounts and configurations that will react slowly with contaminants, such as hydrogen cyanide, present in the air stream to consume the contaminant(s) while releasing low levels of chlorine dioxide into the air for removing other contaminants or reaction products.

The apparatus can further include additional one or more absorbent materials for removing or abating other contaminants including, for example, ammonia. These additional materials may include, for example, sepiolite, a naturally occurring magnesium silicate clay having a large specific surface area and porosity with a high absorption capacity or activated carbon. The sepiolite component will tend to remove ammonia from the air passing over the surface of the materials provided in the apparatus. Ammonia accumulation is a health and environmental risk associated with a number of industrial and mining processes including, for example, stripping circuits used in carbon-in-pulp (CIP) or carbon-in-leach (CIL) processes for gold recovery.

The use of these systems, apparatus and associated methods provides improved air quality for the personnel working in these facilities and would allows the plant operations to use increased levels of cyanide dosing in their processes to increase gold production while maintaining satisfactory air quality levels.

Figure 2:
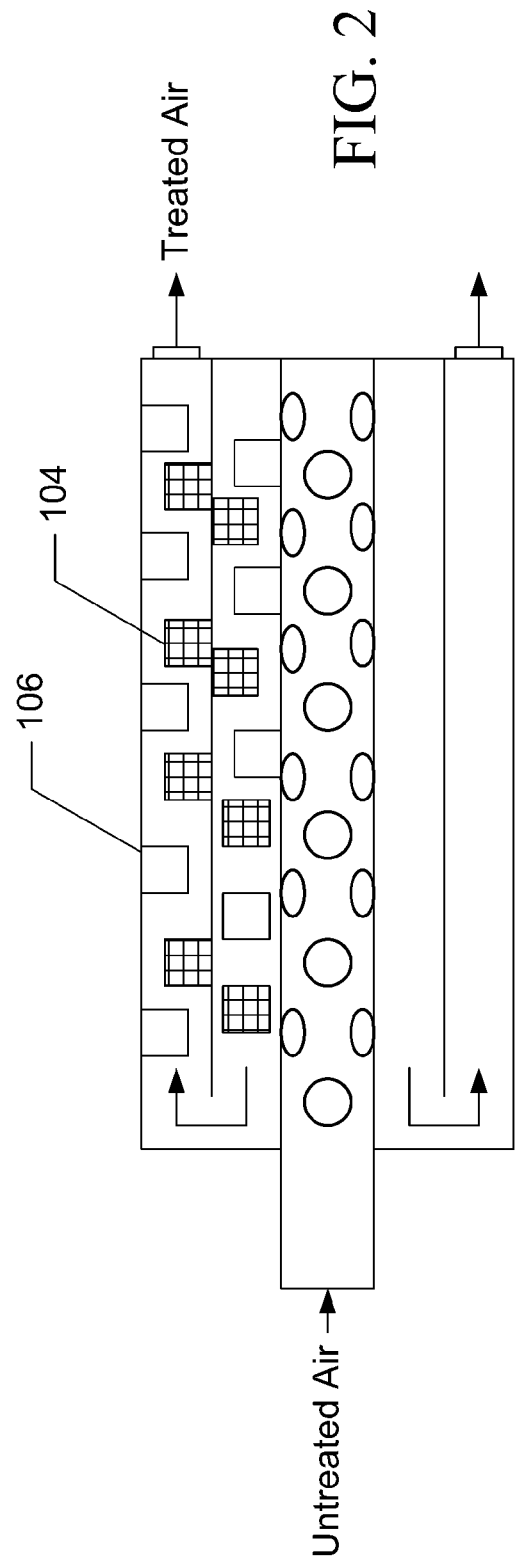
FIG. 2 illustrates a second example embodiment of an apparatus that can be used to practice the method of controlling reactive gases using forced convection.

The number of air treatment apparatus, for example, air sachets, see FIG. 1, filter assemblies, see FIG. 2, air handlers, see FIG. 3, or bypass lines, see FIG. 4, or blower/bed or fluidized bed assemblies utilizing zeolite particles 104 charged with a treatment compound and, optionally, sepiolite or other absorbent particles 106, can be relatively low while still achieving the desired improvement in air quality. A method of utilizing the apparatus would include placing sachets or other air treatment assemblies containing the particles within a mesh, fabric, membrane or other suitable layer 102 would be placed in known problem areas, monitoring the cyanide levels in the ambient air and replacing or recharging the sachets or assembly carrier particle charges as needed to maintain acceptable levels. See FIG. 1. The ratio of the sepiolite and zeolite/chlorite can also be adjusted to reflect the relative concentrations of ammonia and cyanide in the treated air whereby the components would be used up at similar rates. As will be appreciated by those skilled in the art, the ratio within a single sachet can be adjusted to achieve this coordinated exhaustion across a range of contaminant mixtures.

Although it is believed that a method using passive apparatus would be sufficient to provide adequate improvement in the air quality, as will be appreciated by those skilled in the art, the sepiolite and zeolite/chlorite combination of materials could be incorporated into assemblies suitable for use in forced convection applications. Depending on the configuration of the materials, the assemblies could include, for example, panels, screens, plates, beds, hoppers, tumblers, fluidized beds and/or terminal filters, see FIG. 2. The active materials can be arranged in an air permeable assembly 114 that is arranged in a primary flow circuit of a ventilation system having a blower or fan 108 for moving increased volumes of air through the treatment assembly for removing or reducing contaminants including, for example, ammonia and hydrogen cyanide. See FIG. 3. Alternatively, the active materials can be arranged in an air permeable assembly that is arranged in a secondary or bypass flow circuit 118 of a ventilation systems whereby the air flow through the assembly can be throttled or stopped by a valve 110 and/or controlled by a secondary blower 112 as desired to provide varying levels of treatment in response to monitor data, plant operations or other conditions and/or could be configured with different treatment modules 114, 116. See FIG. 4.

Although only several exemplary embodiments of this invention have been described in detail, it will be readily apparent to those skilled in the art that the disclosed air treatment processes and associated systems may be modified from the exact embodiments provided herein without materially departing from the essential characteristics thereof. Accordingly, therefore, these disclosures are to be considered in all respects as illustrative and not restrictive. As will be appreciated by those skilled in the art, a number of other embodiments of the methods according to the disclosure are both feasible and would be expected to provide similar advantages. The scope of the invention, therefore, should be understood as encompassing those variations of the example embodiments detailed herein that would be readily apparent to one of ordinary skill in the art.

Further, while certain process steps are described for the purpose of enabling the reader to make and use certain air treatment processes shown, such suggestions shall not serve in any way to limit the claims to the exact variation disclosed, and it is to be understood that other variations, including various combinations of treatment compounds and particle materials and configuration, may be utilized in practicing the disclosed methods.

We claim:

1. A method for reducing acidic gas contamination, the method comprising:
   directing a feed gas stream containing a pretreatment concentration of an acidic gas compound onto carrier particles, the carrier particles having a surface supporting a treatment compound; and
   reacting a portion of the acidic gas compound with the treatment compound under conditions whereby the portion of the acidic gas compound is consumed to produce a treated gas stream,
      wherein the acidic gas compound is selected from the group consisting of hydrogen cyanide, hydrogen sulfide, hydrochloric acid, hydrogen fluoride, hydrogen iodide, hydrogen bromide, nitric acid vapor, chlorine, carbon disulfide, mercaptans and mixtures thereof.

2. The method for reducing acidic gas contamination according to claim 1, wherein:
   when the portion of the acid gas compound is consumed, it further produces a reaction product gas that is less hazardous than the acidic gas compound, and the reaction product gas is released into the treated gas stream.

3. The method for reducing acidic gas contamination according to claim 2, wherein:
the reaction product gas is chlorine dioxide.

4. The method for reducing acidic gas contamination according to claim 2, wherein:
the reaction product gas is released at a concentration below the pretreatment concentration of the acidic gas compound.

5. The method for reducing acidic gas contamination according to claim 2, wherein:
a portion of the reaction product gas released into the treated gas stream reacts with a second contaminant compound in the treated gas stream.

6. The method for reducing acidic gas contamination according to claim 5, wherein:
the reaction product gas is chlorine dioxide.

7. The method for reducing acidic gas contamination according to claim 5, further wherein:
the second contaminant compound is an organic compound.

8. The method for reducing acidic gas contamination according to claim 1, wherein:
the carrier particles are selected from the group consisting of aluminosilicate minerals, hydrous aluminium phyllosilicates and mixtures thereof.

9. The method for reducing acidic gas contamination according to claim 1, wherein:
the carrier particles are selected from the group consisting of zeolites, sepiolites and mixtures thereof.

10. The method for reducing acidic gas contamination according to claim 1, wherein:
the treatment compound comprises sodium chlorite.

11. The method for reducing acidic gas contamination according to claim 1, wherein:
the feed gas stream is directed over a combination of absorbent particles and the carrier particles.

12. The method for reducing acidic gas contamination according to claim 1, wherein the acidic gas compound is selected from the group consisting of hydrogen cyanide, hydrogen fluoride, hydrogen iodide, hydrogen bromide, nitric acid vapor, chlorine, carbon disulfide, mercaptans and mixtures thereof.

13. The method for reducing acidic gas contamination according to claim 12, wherein the acidic gas compound is selected from the group consisting of hydrogen cyanide, hydrogen fluoride, hydrogen iodide, hydrogen bromide, nitric acid vapor, chlorine, and mixtures thereof.

14. A system for reducing acidic gas contamination in an ambient gas, the system comprising:
a blower assembly for directing the ambient gas onto a plurality of carrier particles, the carrier particles having surfaces supporting a treatment compound;
a containment assembly for maintaining contact between the ambient gas and the treatment compound for a reaction period, the reaction period being sufficient to allow a portion of the acidic gas to react with the treatment compound under conditions whereby the portion of the acidic gas is consumed to form a treated gas stream; and
an output assembly for releasing the treated gas stream from the system,
wherein the acidic gas is selected from the group consisting of hydrogen cyanide, hydrogen sulfide, hydrochloric acid, hydrogen fluoride, hydrogen iodide, hydrogen bromide, nitric acid vapor, chlorine, carbon disulfide, mercaptans and mixtures thereof.

15. A system for reducing acidic gas contamination in an ambient gas according to claim 14, further comprising:
a filter assembly for removing particles before the treated gas stream is released from the system.

16. A system for reducing acidic gas contamination in an ambient gas according to claim 14, wherein:
the containment assembly has a configuration selected from the group consisting of fluidized beds, packed beds, filter cartridges and sachets.

17. A system for reducing acidic gas contamination in an ambient gas according to claim 14, further comprising:
a gas monitoring system configured for determining an ambient concentration of the acidic gas; and
a control system configured for activating the blower assembly when the gas monitoring system detects an ambient concentration of the acidic gas above a high target level.

18. A system for reducing acidic gas contamination in an ambient gas according to claim 17, wherein:
the control system is further configured for deactivating the blower assembly when the gas monitoring system detects an ambient concentration of the acidic gas below a low target level.

19. The method for reducing acidic gas contamination according to claim 14, wherein the acidic gas compound is selected from the group consisting of hydrogen cyanide, hydrogen fluoride, hydrogen iodide, hydrogen bromide, nitric acid vapor, chlorine, carbon disulfide, mercaptans and mixtures thereof.

20. The method for reducing acidic gas contamination according to claim 19, wherein the acidic gas compound is selected from the group consisting of hydrogen cyanide, hydrogen fluoride, hydrogen iodide, hydrogen bromide, nitric acid vapor, chlorine, and mixtures thereof.

21. A method for reducing acidic gas contamination, the method comprising:
directing a feed gas stream containing a pretreatment concentration of an acidic gas compound onto carrier particles, the carrier particles having a surface supporting a treatment compound; and
reacting a portion of the acidic gas compound with the treatment compound under conditions, whereby the portion of the acidic gas compound is consumed to produce a treated gas stream, and the reaction further produces chlorine dioxide that is released into the treated gas stream.

22. A method for reducing acidic gas contamination, the method comprising:
directing a feed gas stream containing a pretreatment concentration of an acidic gas compound onto carrier particles, the carrier particles having a surface supporting a treatment compound; and
reacting a portion of the acidic gas compound with the treatment compound under conditions, whereby the portion of the acidic gas compound is consumed to produce a treated gas stream,
wherein the carrier particles are selected from the group consisting of aluminosilicate minerals, hydrous aluminium phyllosilicates, zeolites, sepiolites and mixtures thereof.

* * * * *